Aug. 21, 1928.
F. W. HORSTMANN
1,681,917
FEEDING MECHANISM FOR FUR SHEARING MACHINES
Filed Feb. 7, 1925　　4 Sheets-Sheet 4
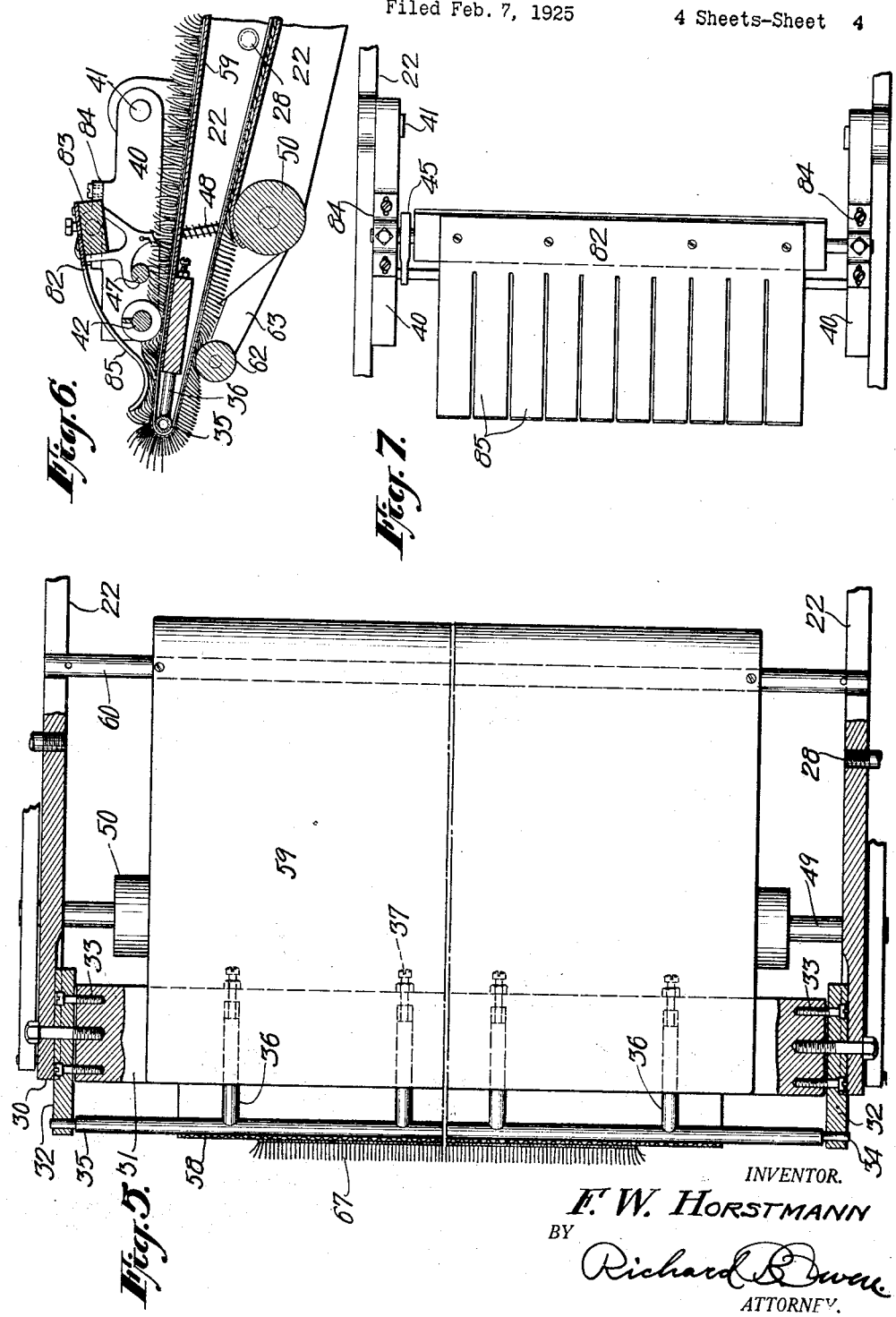
INVENTOR.
F. W. HORSTMANN
BY
Richard B. Owen
ATTORNEY.

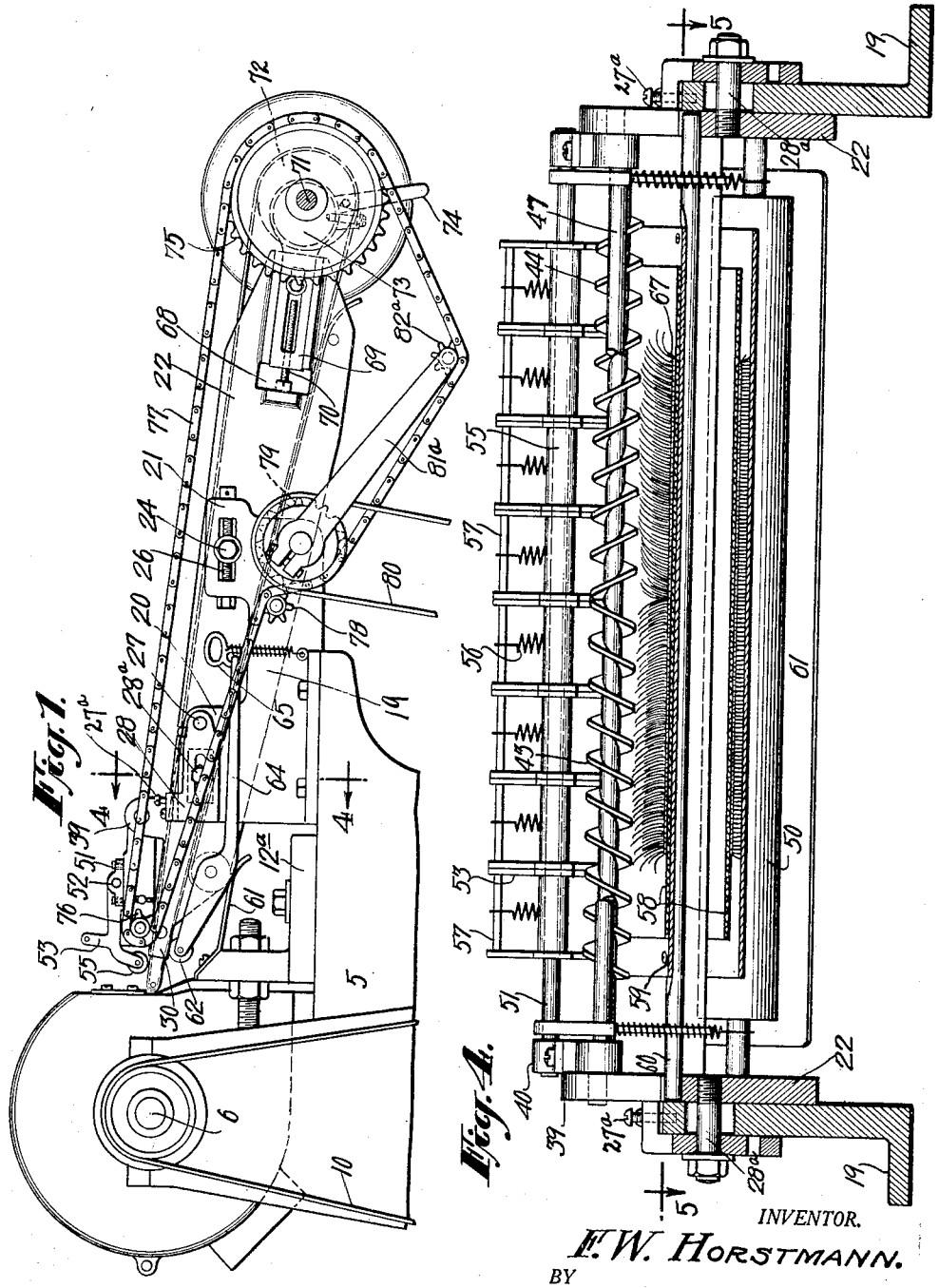

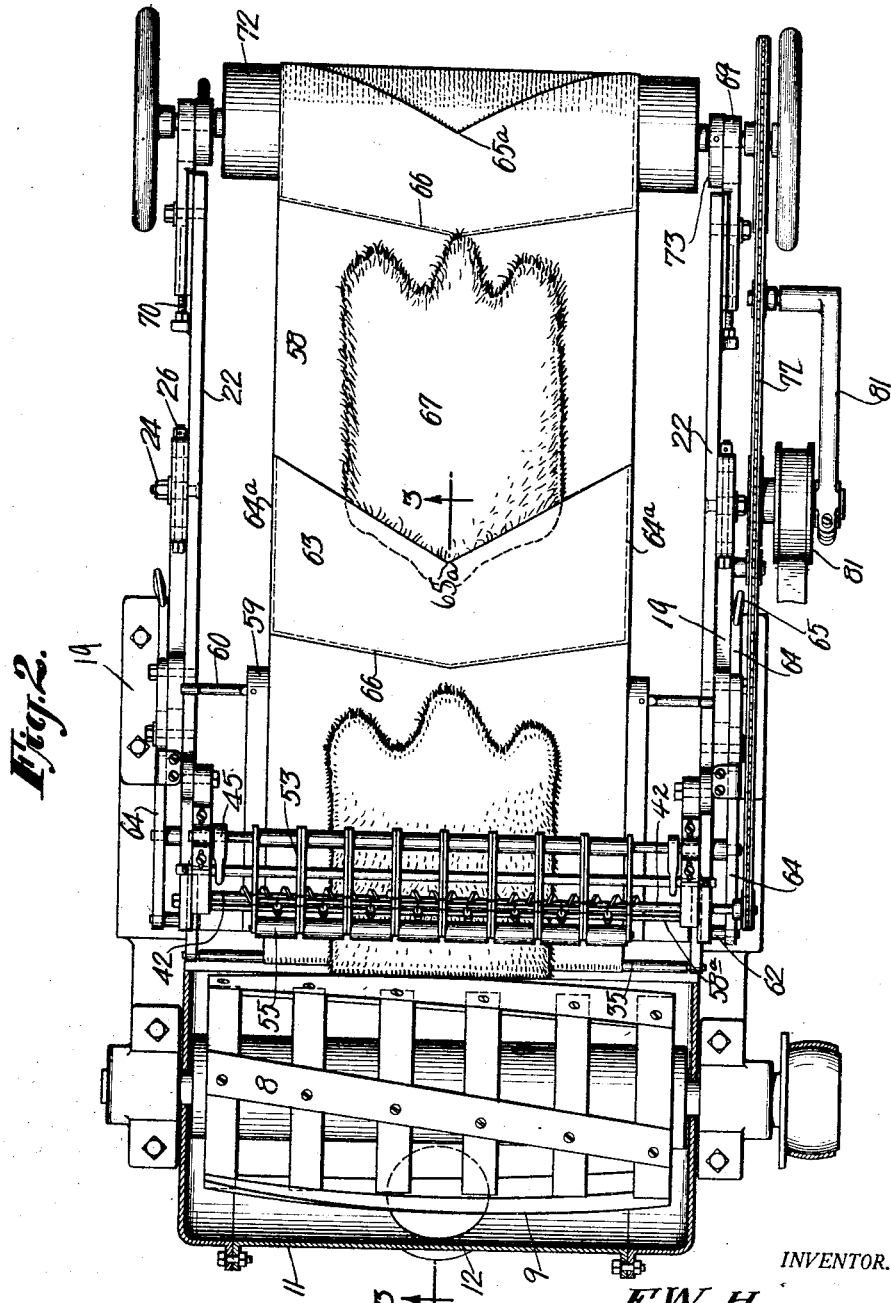

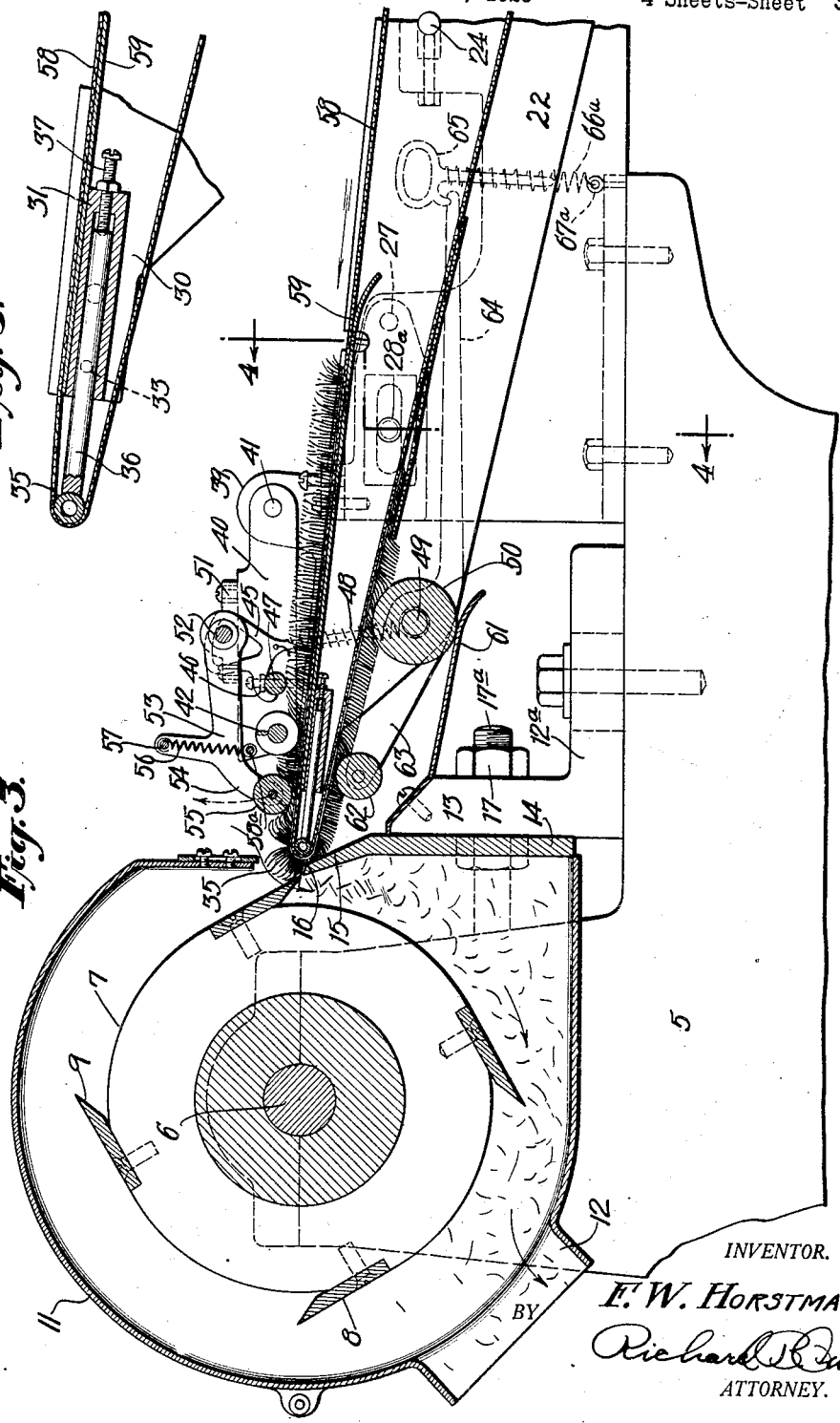

Patented Aug. 21, 1928.

1,681,917

UNITED STATES PATENT OFFICE.

FREDERICK W. HORSTMANN, OF IRVINGTON, NEW JERSEY.

FEEDING MECHANISM FOR FUR-SHEARING MACHINES.

Application filed February 7, 1925. Serial No. 7,671.

This invention relates to fur shearing machines and has for an object to provide a machine in which skins of small size and dimension, having irregular formations, may be sheared by feeding the said skins toward the shearing mechanism in a continuous manner, thereby obviating the necessity of temporarily stitching the ends of the skins together, as has been the practice heretofore.

Another object of my invention is to provide a machine for trimming or shearing furs and skins which includes a conventional clipping mechanism, and in addition thereto an endless conveyor whereby the skins may be placed on the said conveyor, one behind the other and fed continuously toward and away from the clipping mechanism, as occasion requires, to present the surface of the skins to said mechanism.

Another object of my invention is to provide a shearing mechanism whereby the skins may be spread apart during their passage toward the cutting knives, including resilient means for engaging the top surface of the skins in such manner that the skins will be fed evenly and regularly toward the cutting knives so as to produce an even cut, all of which being produced in an automatic manner and without attention on the part of the operator.

Another object of my invention is to provide, in a shearing mechanism, of the character above set forth, a novel and improved endless belt or conveyor consisting of a plurality of pockets for receiving the ends of the respective skins being fed toward the clipping knives.

A further object of my invention is to provide a fur trimming machine in which the frame and the endless conveyor may be shifted and adjusted with respect to a stationary cutting mechanism so as to compensate for any irregularities in the character of work des'red, said frame being adjustable longitudinally as well as vertically.

A continued object of my invention is to provide a fur trimming machine having a series of resilient friction rollers, constructed and arranged on an adjustable frame and positioned adjacent a stationary cutting mechanism, certain of said rollers being mounted so that they may be moved rearwardly to an inoperative position so that access may be gained to the end of the frame and the cutting knives.

In addition to the foregoing objects and others which will be readily recognized by those skilled in the art, reference is had to the accompanying drawings showing a preferred embodiment of my invention, wherein;

Figure 1 is a side view showing the machine embodying my invention.

Figure 2 is a plan view.

Figure 3 is an enlarged view, partly in section, taken substantially on the line 3—3 of Figure 2.

Figure 3ª is a sectional view of the front of the frame and endless conveyor, showing the tension roller and the means for preventing its distortion.

Figure 4 is a front elevation, partly in section, taken on the line 4—4 of Figure 3.

Figure 5 is a plan view, partially in section, showing the supporting plate for the endless conveyor, located at the front of the frame.

Figure 6 is a sectional view of a modified form of gripping or tensioning means for engaging the surface of the work as it is fed toward the shearing mechanism.

Figure 7 is a plan view of the modified form of the plate shown by Figure 6.

Referring now to the drawings wherein like reference characters designate corresponding parts throughout the several views, 5 designates a portion of a frame or support of any conventional type, having suitable bearings on which the drum shaft 6 is mounted, the drum shaft having a cutter head 7 keyed thereto. The cutter head has a plurality of knives or blades 8, each blade having a bevelled edge 9, so as to produce a shearing or cutting action when rotated at a very high speed by means of the endless belt or drive pulley 10, operated through any suitable source of power, (not shown). The cutter head and knives, of course, are enclosed in a housing or hood 11, into which the hair falls and passes out through the exit opening or chute 12, by means of an exhaust fan.

A bed knife holder 12ª, L-shaped in cross section is bolted to the support 5, the vertical portion 13 of said bed knife holder having attached thereto, a bed knife 14, the upper end 15 of which is directed inwardly toward the drum head and provided with a cutting edge 16, which is adapted to cooperate with the cylinder knives or blades, heretofore referred to. The said bed knife is bolted to the bed knife holder by suitable bolts and nuts 17, 17ª, and of course, may be removed for sharpening purposes as is well understood.

The frame 5 also supports a pair of side brackets 19 and carries slotted extensions for both longitudinally and vertically adjusting the side frames 22. A stud 24 and stud bolt extend through the slotted extension 21 and pass through the side frame, being longitudinally adjustable therewith by the feed screw 26. The front slotted extension 20 has pivoted thereto, as at 27, the plate 28, which is also fastened to the side frame by the stud bolt 28ª. The forward end of the side frames may be adjusted vertically to a slight degree by the screws 27ª in order to allow for the wearing of the bed plate knife. The side frames taper toward the front end 30 and carry a slotted head 31. A pair of roller supporting plates 32 are attached by suitable screws 33, see Figure 5, the ends of the head 31 being adapted to receive the reduced portions 34 of a freely rotatable roller 35. The roller is preferably of a substantially small diameter, so that when the skins or fur passes thereover, the individual hairs will be prominently presented to the cutting action of the knives, or in other words over the bevelled edge 16 of the bed knife plate, and in the path of movement of the cylinder knives 8, as clearly shown by Figure 3 of the drawings. In order to prevent distortion of the freely rotatable roller 35 by reason of its small diameter and to compensate for any uneven stress or strain on the said roller, I have provided a plurality of evener bars 36 within the head 31, the front ends of said evener bars engaging the said roller, the opposite ends of the said evener bars 36 being capable of adjustment by the threaded screws 37 as shown more clearly by Figure 3ª of the drawings.

Each side frame is provided with a vertical extension 39 to which a roller supporting plate 40 is pivotally connected as at 41 and extends forwardly toward the cutting mechanism. The supporting plate carries a transversely extending spreading roller 42, the threads 43, 44, of which are reversely directed from the center being adapted to engage the surface of the skins to be sheared as they pass forwardly on the conveyor belt, subsequently to be referred to. In order to retain the said spreading roller in engagement with the skins, resiliently held clamps 45 are provided, each of said clamps having a hooked portion 46 for gripping a transverse rod 47, which also extends between the plates 40. The rod 47 may be adjusted vertically by screws so that too much pressure will not be exerted by the spreading roller on the conveyor belt. The clamps above referred to have their lower ends connected by a spring 48, to a shaft 49 on which is mounted a guide roller 50, the guide roller being supported between the frames 22, above referred to. The said plate 40 also supports and carries a longitudinally adjustable bearing 51, on which a shaft 52 is mounted.

The shaft 52 carries a plurality of levers 53, which extend forwardly and are directed downwardly as at 54 toward the endless conveyor, said levers supporting independent, substantially narrow rollers 55, which are adapted to frictionally engage the surface of the skins as they pass therebeneath. In order to maintain the rollers 55 in engagement with the skins, I provide a coiled spring 56 for each of the levers, the upper ends of each coil being connected to a rod 57 and the lower end of the coil to a second rod 58ª, supported by the plates 40, as shown in Figure 3.

It will be understood that when the clamps 45 are released, not only the roller 42 but the levers carrying the narrow rollers 55 may be swung back as a unit on the pivots 41, so that access can be had to the conveyor belt and the cutting knives, as well as to gain access to the evener bars and the front roller 35 should it be necessary. The advantage of course, in providing a plurality of independently movable narrow rollers to engage the surface of the skins to be sheared, will be recognized when it is known that the thickness of the skin varies at different places and particularly at the edges, so that the respective rollers may rise and fall slightly, by reason of the uneven surface as the fur passes beneath and toward the shearing mechanism. If a single roller were used, an uneven surface would be presented to the shearing mechanism and consequently an uneven cut would result to the skin. In order to obtain even and regular work, it is necessary that the skins be held taut, that the hair be presented prominently to the shearing mechanism and an even surface be presented at all times, even though the hair on the skins may be thicker in one place than in another.

An important feature of my invention also resides in the particular construction of the conveyor belt, designated by numeral 58, said belt being adapted to pass over a smooth surface, such as a pan 59, which as shown in Figure 5 is secured and held on a transverse bar 60 and extends forwardly over the head 31. The pan therefore serves as a base for the spreading roller 42 as well as the friction rollers 55. A bottom pan 61 is secured to the top of the bed knife holder 12 and retards the upward air draft into the housing or hood 11. Between the frames and below the pan 59 and slotted head 31, a belt tightening roller or belt tensioning roller 62 is provided on the angular portion 63 of a pair of elongated rearwardly extending levers 64, said levers being each held by a clamp 65, said clamp being similar in construction to the clamp 45, heretofore referred to. The spring 66a of the clamp 65 is attached at one end to an eye 67a. Consequently, by releasing the clamps 65, the roller 62 may become disengaged from the conveyor belt 58 as may be necessary when releasing or shifting the belt on the mechanism. The roller 62 is very essential at this point for the reason that considerable tension must be exerted on the conveyor belt and the skin being sheared, so that when the said skin passes over the roller 35, it is held snug and taut to the surface of the conveyor belt to move along therewith.

The front edge of the skin is always irregular. In order to properly retain the skins on the conveyor belt and at the same time prevent their shifting as they are being sheared, I have provided a plurality of pockets, each formed by a strip of material 63, which may be of canvas or other flexible material and which is stitched along the longitudinal edges 64a of the belt and also transversely thereof as indicated by the stitches 66, the front edge being free and open so that the leading or irregular front end of the skin 67 may be inserted. Referring to Figure 2 of the drawings wherein the pocket is shown, it will be observed that the front edge of the strip 63 is cut in toward the center 65a, producing a V-shaped edge. After considerable experiment, I have found that unless the pocket and particularly the front edge is formed in this manner, the skin will have the tendency to be pulled out of the pocket. However, since the extreme end of the irregular edge of the skin passes over the roller 35 and underneath the same in advance of the wider portion of the skin, the pocket firmly grips and exerts considerable pressure in retaining the skin as it rolls about the very narrow roller 35, it being of course understood that the conveyor belt is under considerable tension at this point. After the belt and the pocket pass over the roller 35, the skin being held tightly therein, pass on over the roller 62 located adjacent the front end of the frames 22. The roller 62 also assists in maintaining the skin snug to the surface of the belt as it continues. This same effect could not be efficiently had if the roller 35 were of an increased diameter or if considerable tension were not exerted on the conveyor belt at a point adjacent the shearing mechanism. The narrow roller 35 permits only of a very small area of the skin or the hairs to be presented to the shearing action of the knives and it will also be recognized that the individual hairs of the skin are presented evenly so that a regular, even cut is produced. If the length of cut of the skin is too much or not enough, the front roller 35 may be moved rearwardly or forwardly, or should the knives begin to wear, the front end of the frames 22 may be raised slightly by an adjustment of the bolt 28.

The advantage of providing a conveyor belt having pockets made in the manner above described will be readily appreciated, when it is understood that in the present practice of shearing skins, they are first sewed to each other, end to end. The front end of the first skin is then pinned or fastened on the conveyor belt and as the endless train of skins are fed toward the shearing mechanism, the operator must keep straightening and flattening the skins as they are advanced.

Referring again to Figure 1 of the drawings, means are provided for adjusting the opposite ends of the side frames 22, which are slotted as at 68 to receive an adjusting block 69. The block 69 is longitudinally adjustable by the threaded screws 70, the said block carrying the shaft 71 on which the rear conveyor belt 72 is mounted. The screws 70 may be adjusted to keep a proper tension on the conveyor belt and either the left hand or the right hand screw of either side frame 22 may be adjusted so that the belt will run straight. An eccentric 73 is keyed on the shaft 71 and a releasing handle 74, attached to the eccentric, permits the roller 72 to be released when it is desired to remove tension from the conveyor belt in making adjustments.

The operating mechanism for driving the endless conveyor belt and the reversely threaded spreading roller 42 is accomplished by suitable sprocket and chain gearing. On the shaft 71, a large sprocket 75 and on the spreading roller 42, a smaller sprocket 76 is provided over which the sprocket chain 77 is trained. An idler sprocket 78 mounted in one of the brackets, substantially intermediate the ends of the frame as well as a driven sprocket 79, cooperates with the endless chain 77, the driven sprocket 79 being operable by means of a suitable belt 80 on a pulley wheel 81, through any suitable source of power, not shown. A tension lever 81a having an idler sprocket 82a mounted thereon is located between the sprocket 75 and the sprocket 79. It will of course be recognized that other types of conveyor belt operating mechanism and means for operating the spreading roller 42 may be resorted to.

In Figures 6 and 7, I have shown a modified form of friction and tensioning device that may be substituted and utilized in place of the rollers 55 as shown by Figures 2 and 3 of the drawings to accomplish the same result. Essentially the modified form of the invention consists of a substantially rectangular, resilient plate 82 secured to the top of a block or bar 83, mounted in adjustable bearings 84 in the plates 40. The plate 82 is split or cut to provide a plurality of spring fingers 85, the forward ends of which are adapted to bear against the surface of the endless belt and to engage the surface of the skins as they pass forwardly over the roller 35. It will be seen that in this form of the invention that the flexible fingers may conform to the irregularity of the thickness of the skins in the same manner as the rollers, and yet maintain sufficient pressure thereon so that the skins remain taut and spread out as they advance toward the shearing mechanism. In this form of the invention, the plate 82 being mounted on the pivoted plates 40, may also be thrown backward on the pivot 41 and removed from the front ends of the frame 22, when it is desired to gain access to the cutting knives and the bed knife plate. Other types of resilient or spring tensioning means may be similarly mounted on the adjustable bearings 84 to accomplish the same purpose.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. In a fur trimming machine, a shearing mechanism, an endless conveyor adjustable relative to the shearing mechanism and flexible means carried by said conveyor for holding a skin upon said conveyor.

2. In a fur trimming machine, as hearing mechanism, an endless conveyor, means for adjusting the front end of the conveyor relative to the shearing mechanism and flexible means carried by said conveyor for holding a skin upon said conveyor.

3. In a fur trimming machine, a shearing mechanism, a support, side frames and guide rollers mounted on the support, a conveyor belt passing over the rollers and flexible means carried by the conveyor belt for holding a skin upon said conveyor.

4. In a fur trimming machine, a shearing mechanism, a support, side frames and guide rollers mounted on the support, means for longitudinally adjusting the front ends of the frames relative to the shearing mechanism, a conveyor belt passing over the rollers and spaced flexible means carried by the conveyor belt for holding skins upon said conveyor.

5. In a fur trimming machine, a shearing mechanism, a support, side frames and guide rollers mounted on the support, means for longitudinally and vertically adjusting the front ends of the frames relative to the shearing mechanism, a conveyor belt passing over the rollers and flexible means for holding a skin upon said belt.

6. In a fur trimming machine, a shearing mechanism, a support, and endless conveyor mounted on the support and adjustable relative to the shearing mechanism and a plurality of flexible strips attached to the said conveyor for holding skins upon said conveyor.

7. In a fur trimming machine, a shearing mechanism, a support, side frames having guide rollers mounted on the support, an endless conveyor belt passing over the guide rollers, a spreading roller and flexible means at spaced intervals on the conveyor belt for holding skins upon said conveyor.

8. In a fur trimming machine, a shearing mechanism, a support, side frames having guide rollers mounted on the support, means for adjusting said frames relative to the support and shearing mechanism, means for adjusting the guide rollers relative to the frames, an endless conveyor belt passing over the guide rollers and flexible means on the conveyor belt for holding a skin upon said conveyor.

9. In a fur trimming machine, a shearing mechanism, a support, brackets carried by the support, side frames having a front and rear guide roller mounted on the brackets, means for adjusting the side frames longitudinally and vertically relative to the shearing mechanism, an endless conveyor belt passing over the guide rollers and pockets on said conveyor belt for gripping a skin.

10. In a fur trimming machine, a shearing mechanism, an endless conveyor including guide rollers and an endless belt, a spreading roller and resilient tensioning means for engaging the surface of the endless belt, and flexible means on the endless belt for holding a skin upon said conveyor.

11. In a fur trimming machine, a shearing mechanism, an endless conveyor including guide rollers and an endless belt, a spreading roller and resilient tensioning means for engaging the surface of the endless belt, and means for disengaging the spreading roller and tensioning means from the endless belt.

12. In a fur trimming machine, a shearing mechanism, an endless conveyor including guide rollers and an endless belt, and tensioning means for engaging the surface of the endless belt comprising a plurality of independently movable rollers in substantial alignment with each other.

13. In a fur trimming machine, an endless conveyor including guide rollers and an endless belt, and resilient tensioning means for engaging the surface of the endless belt comprising a plurality of levers and independent rollers carried by said levers, said rollers being in substantial alignment with each other.

14. In a fur trimming machine, a shearing mechanism, an endless conveyor including guide rollers and an endless belt, tensioning means for engaging the surface of the endless belt comprising a plurality of independent resiliently mounted rollers and means for rendering said rollers inoperative, said rollers being in substantial alignment with each other.

15. In a fur trimming machine, a shearing mechanism, an endless conveyor including guide rollers and an endless belt, a spreading roller and tensioning means for engaging the surface of the endless belt, said tensioning means comprising a plurality of contiguous independent rollers and means for disengaging the spreading roller and independent rollers as a unit from the endless belt.

16. In a fur trimming machine, a shearing mechanism, a support, side frames and guide rollers carried by the support, an endless belt passing over the guide rollers, vertical extensions on the side frames, plates pivoted to the extensions, tensioning means carried by said plates and comprising a plurality of independent rollers for engaging the surface of the endless belt and means for clamping said plates.

17. In a fur trimming machine, a shearing mechanism, an endless conveyor comprising side frames, front and rear rollers and an endless belt, means for adjusting the side frames relative to the shearing mechanism and means for preventing distortion of the front roller.

18. In a fur trimming machine, a shearing mechanism, an endless conveyor comprising side frames, front and rear rollers and an endless belt, means for adjusting the side frames relative to the shearing mechanism, a slotted head having evener bars for preventing the distortion of the front roller.

19. In a fur trimming machine, a shearing mechanism, an endless conveyor comprising side frames, front and rear rollers and an endless belt, means for longitudinally and vertically adjusting the front end of the frames relative to the shearing mechanism, a slotted head having evener bars for engaging the front roller and a flat pan supported by the slotted head and side frames constituting a bearing surface for the endless belt.

20. In a fur trimming machine, a shearing mechanism, an endless conveyor comprising side frames, front and rear rollers and an endless belt, resilient tensioning means carried by the side frames for exerting pressure on the top of the endless belt, and a combined tensioning and guide roller carried by the frame for exerting upward pressure on the bottom of the endless belt at a point below the first mentioned tensioning means.

21. In a fur trimming machine, a shearing mechanism, an endless conveyor comprising side frames, front and rear guide rollers and an endless belt, resilient tensioning means comprising a plurality of independently movable rollers carried by the frames and located adjacent the front guide roller and a combined tensioning and guide roller pivotally mounted between the side frames for exerting upward pressure on the bottom of the endless belt at a point below the first mentioned tensioning means.

22. In a fur trimming machine, a shearing mechanism, an endless conveyor comprising side frames, front and rear guide rollers and an endless belt, said belt having flexible means attached thereto for retaining the edge of a skin to be sheared, resilient tensioning devices for engaging the said belt and flexible means, a tensioning roller carried by the side frames for exerting upward pressure on the bottom of the said belt at a point below the first mentioned tensioning means, said tensioning devices and tensioning roller being adapted to simultaneously engage the flexible means as it passes over the front guide roller.

23. In a fur trimming machine, a shearing mechanism, a frame including a front and rear guide roller and a conveyor belt, means for adjusting said frame relative to the shearing mechanism, means for adjusting the front and rear guide rollers, a spreading roller located at one end of the said frame and drive mechanism for operating the conveyor belt and the spreading roller.

In testimony whereof I affix my signature.

FREDERICK W. HORSTMANN. [L. S.]